United States Patent [19]
Hishikawa

[11] Patent Number: 6,041,492
[45] Date of Patent: Mar. 28, 2000

[54] SPOKE INSERTING APPARATUS

[75] Inventor: Toshiharu Hishikawa, Osaka, Japan

[73] Assignee: Araya Kogyo Kabushiki Kaisha, Osaka, Japan

[21] Appl. No.: 09/057,590

[22] Filed: Apr. 9, 1998

[30] Foreign Application Priority Data

Jan. 29, 1998 [JP] Japan .................................. 10-033959

[51] Int. Cl.[7] .............................. B23P 21/00; B23Q 17/00
[52] U.S. Cl. ........................ 29/714; 29/407.04; 29/407.1; 29/894.332; 157/1.55
[58] Field of Search .............................. 29/720, 721, 700, 29/407.04, 894.33, 894.332, 714, 407.09, 407.1; 157/1.5, 1.55

[56] References Cited

U.S. PATENT DOCUMENTS

| | | |
|---|---|---|
| 4,062,095 | 12/1977 | Storz . |
| 4,187,895 | 2/1980 | Saruwatari et al. . |
| 4,427,047 | 1/1984 | Guillermier . |
| 4,538,332 | 9/1985 | Carminati . |
| 4,799,304 | 1/1989 | Kosaka . |
| 5,014,425 | 5/1991 | Damman . |
| 5,081,755 | 1/1992 | Hishikawa . |
| 5,193,599 | 3/1993 | Plaatsman . |
| 5,301,731 | 4/1994 | Admiraal . |

FOREIGN PATENT DOCUMENTS

| | | |
|---|---|---|
| 03176201 | 7/1991 | Japan . |
| 08091007 | 4/1996 | Japan . |

*Primary Examiner*—David P. Bryant
*Attorney, Agent, or Firm*—Armstrong, Westerman, Hattori, McLeland & Naughton

[57] ABSTRACT

A spoke inserting apparatus for inserting spokes into a hub of a wheel of a bicycle. The operation for adjusting a position, a direction and the like of driving apparatuses, photo-sensors and spoke entanglement preventive apparatuses constituting the spoke inserting apparatus is facilitated. In an apparatus in which a hub 1 is supported in a horizontal attitude, and spokes 20 are inserted into spoke holes 6, 7 obliquely and upwardly of a first collar portion 2 and a second collar portion 3 by four driving apparatuses arranged on both sides of said first and second collar portions, a hub supporting apparatus 10 is provided to reciprocatingly move the hub 1 parallel with obliquely and upwardly, a first driving apparatus 11, a second driving apparatus 12, a first photo-sensor 16 and a first spoke handling apparatus 18 having their relative position and relative attitude determined, and a third driving apparatus 13, a fourth driving apparatus 14, a second photo-sensor 17 and a second spoke handling apparatus 19 likewise having their relative position and relative attitude determined are made integral with each other and can be reciprocatingly moved in a direction of a hub shaft and symmetrically. (FIG. 1)

4 Claims, 9 Drawing Sheets

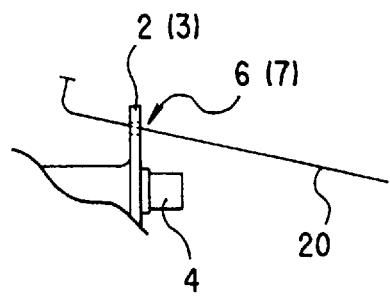
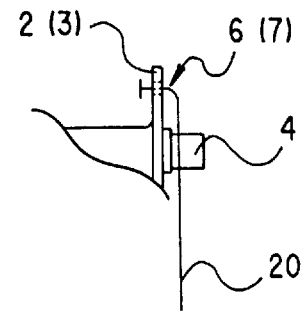
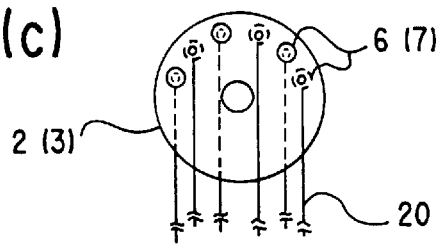
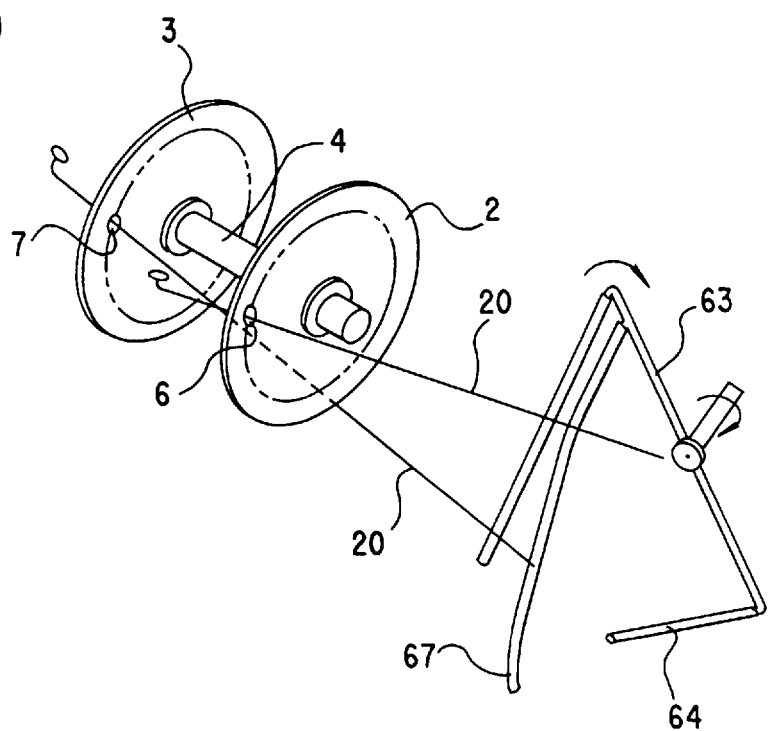

SPOKE INSERTING APPARATUS

BACKGROUND OF THE INVENTION

1. Field of the Invention

The present invention relates to a spoke inserting apparatus for inserting spokes into spoke holes of hub for bicycles or the like.

2. Description of the Related Art

An apparatus for inserting spokes into spoke holes of collar portion of a hub is proposed in Japanese Patent Application Laid-Open No. Hei 3-176201, in which a hub 101 is supported so that a hub shaft 104 is in a horizontal attitude, in which state, spokes are inserted into spoke holes 106 and 107 of the hub 101. This spoke inserting apparatus comprises, as shown in FIG. 10(a), a supporting apparatus (not shown) for supporting the hub 101 in a horizontal attitude and rotatably, a first driving apparatus 111 and a second driving apparatus 112 disposed on right and left of one first collar portion 102 of the hub 101 supported on the supporting apparatus to alternately insert spokes from inside and outside into the spoke holes 106 of the first collar portion 102, a third driving apparatus 113 and a fourth driving apparatus 114 disposed on right and left of the other second collar portion 103 of the hub 101 to alternately insert spokes from inside and outside into the spoke holes 107 of the second collar portion 103, and a sensor (not shown) for detecting that the spoke holes 106 of the first collar portion 102 and the spoke holes 107 of the second collar portion 103 are in a predetermined position. In this spoke inserting apparatus, as shown in FIG. 10(b), the hub 101 supported on the hub supporting apparatus 117 is rotated, when the detection is made that the spoke holes 106 and 107 are in a predetermined position, the rotation of the hub 10 is stopped so that the spokes are inserted into spoke holes 106a and 107a adjacent to the spoke holes 106 and 107 by the driving apparatuses 111 and 113 on one side, and at the same time, the spokes are inserted into spoke holes 106b and 107b adjacent thereto by the driving apparatuses 112 and 114 on the other side. After the operation of inserting spokes as described above, the hub is further rotated and the operation similar to the above is repeated whereby the spokes are alternately inserted in the reverse direction into all the spoke holes 106 and 107.

The spoke inserting apparatus shown in FIG. 10(a) is cumbersome because in the case where the size of the hub 101, for example, the spacing between the first collar portion 102 and the second collar portion 103, the pitch of the spoke holes 106, 107, and the diameter of the first collar portion 102 and the second collar portion 103 (that is, the diameter of a circular track in which the spoke holes 106, 107 are disposed), etc. are changed, it is necessary to separately adjust the position and attitude of the first driving apparatus 111, the second driving apparatus 112, and the third driving apparatus 113, and the fourth driving apparatus 114. The spoke inserting apparatus which improved the aforementioned drawback is proposed in Japanese Patent Application Laid-Open No. Hei 8-91007. In this spoke inserting apparatus, the spoke driving directions of the first driving apparatus 111 and the second driving apparatus 112 for inserting the first collar portion 102 are intersected by the spoke inserting hole located obliquely upwardly of the hub shaft 104 out of all the spoke holes 106 of the first collar portion 102, a first photo-sensor 115 having an optical axis passing through a point of intersection 120 and outputting a signal in the state in which the optical axis coincides with the spoke hole 106, and the relative position and the relative attitude of the first driving apparatus 111, the second driving apparatus 112 and the first photo-sensor 115 are fixed. On the other hand, the spoke driving directions of the third driving apparatus 113 and the fourth driving apparatus 114 for inserting the first collar portion 103 are intersected by the spoke inserting hole located obliquely upwardly of the hub shaft 104 out of all the spoke holes 107 of the second collar portion 103, a second photo-sensor 116 having an optical axis passing through a point of intersection 121 and outputting a signal in the state in which the optical axis coincides with the spoke hole 107, and the relative position and the relative attitude of the third driving apparatus 113, the fourth driving apparatus 114 and the second photo-sensor 116 are fixed. The first driving apparatus 111, the second driving apparatus 112 and the first photo-sensor 115, and the third driving apparatus 113, the fourth driving apparatus 114 and the second photo-sensor 116 are made integral with each other and can be reciprocated in the direction of the hub shaft 104 of the hub 101 and in symmetrically to right and left about the hub 101.

As described above, in the conventional apparatus, the spoke driving directions of the first driving apparatus 111 and the second driving apparatus or third driving apparatus 113 and the fourth driving apparatus 114 for inserting the spokes from inside or outside of the first collar portion 102 or the second collar portion 103, and the first photo-sensor 115 and the second photo-sensor 116 of the optical axes passing through the points of intersections 120 and 121 are provided. Therefore, even if the pitches of the spoke holes 106 and 107 of the hub 101 are different, if the rotation of the hub 101 is stopped when the first photo-sensor 115 and the second photo-sensor 116 detect the spoke holes 106 and 107 of the first collar portion 102 and the second collar portion 103, the driving directions of the first driving apparatus 111 to the fourth driving apparatus 114 are directed at the spoke inserting holes and in the state capable of inserting the spokes. Therefore, the position and attitude of the first driving apparatus 111 to the fourth driving apparatus 114 need not be adjusted for the purpose. Further, the first driving apparatus 111, the second driving apparatus 112 for inserting the first collar portion 102 and the first photo-sensor 115, and the third driving apparatus 113, the fourth driving apparatus 114 for inserting the second collar portion 103 and the second photo-sensor 116 are made integral with each other and can be reciprocated in the direction of the hub shaft 104 of the hub 101 and in symmetrically to right and left about the hub 101. Therefore, even if the spacing between the first collar portion 102 and the second collar portion 103 is different, the point of intersection 120 of the driving directions of the first driving apparatus 111 and the second driving apparatus 112, and the point of intersection 121 of the driving directions of the third driving apparatus 113 and the fourth driving apparatus 114 can be coincided with the spoke inserting hole of the first collar portion 102 and the spoke inserting hole of the second collar portion 103, respectively, by the reciprocating movement as described, enabling the simple correspondence without adjusting the attitude of the first driving apparatus 111 to the fourth driving apparatus 114. Further, the hub supporting apparatus 117 is provided with a vertical moving mechanism 118 capable of vertically reciprocating the supported hub 101 within a plane vertical to the direction of the hub shaft 104 and a lateral moving mechanism capable of laterally reciprocating it, as shown in FIG. 12. Therefore, even if the diameters of the first collar portion 102 and the second collar portion 103, the point of intersection 120 of the driving directions of the first driving apparatus 111 and the second driving apparatus 112, and the point of intersection 121 of the driving directions of the third driving apparatus 113 and the fourth driving apparatus 114 can be coincided with the spoke inserting hole of the first collar portion 102 and the spoke inserting hole of the second collar portion 103, respectively, by the vertical moving mechanism 118 and the lateral moving mechanism 119, making the individual adjustment of the first driving apparatus 111 to the fourth driving apparatus 114.

Further, by the mere driving of the spoke according to the driving apparatus of the spoke inserting apparatus as described above, the spokes can not be completely inserted into curved heads of the spoke holes 106, 107 of the collar portions 102, 103, resulting in the half-inserted state (see FIG. 8(a)) in which the spokes are inserted into the midst thereof. Therefore, there is disposed a spoke entanglement preventive apparatus (a spoke handling apparatus) for pulling the half-inserted spoke into a completely inserting position (see FIG. 8(b)) as disclosed in Japanese Patent Application Laid-Open No. Hei 3-176203. The spoke entanglement preventive apparatus includes an arrangement wherein a turnable rod-like pull-in piece is placed in contact with an extreme end of a spoke, and an arrangement which has a holding portion capable of holding an extreme end of a spoke, the holding portion being provided slidably in a pull-in direction. These apparatuses are provided every driving apparatus, totalling to four. In these spoke entanglement preventive apparatuses, every time a hub different in size is changed, the spacing relative to the hub has to be separately adjusted by hand.

In the spoke inserting apparatuses shown in FIGS. 11 and 12, in the case of being applied to the hub 101 different in size, it is not necessary to individually adjust the first driving apparatus to the fourth driving apparatus 114 as described above, but every halves may be integrally relatively moved, which is therefore handy as compared with the spoke inserting apparatus shown in FIG. 10(a) while is still cumbersome in that the hub 101 need be moved vertically and laterally by the hub supporting apparatus 117. Furthermore, in the apparatuses, no consideration is taken into the case where in the integral adjustment as described above, the spoke entanglement preventive apparatus (the spoke handling apparatus) is provided in which the spokes inserted into the spokes 106, 107 of the first collar portion 102 and the second collar portion 103 of the hub 101 are inserted and moved to the final inserting position.

It is an object of the present invention to solve the problems as noted above and provide a spoke inserting apparatus in which in the case where a hub is first set and in the case where a hub whose size is changed is set, positions and directions of various apparatuses such as driving apparatuses, photo-sensor, spoke entanglement preventive apparatuses, etc. can be adjusted easily.

SUMMARY OF THE INVENTION

According to a first aspect of the present invention, there is provided a spoke inserting apparatus comprising: a first driving apparatus and a second driving apparatus arranged on both sides of a first collar portion of a hub to alternately insert spokes from inside and outside into spoke holes of the first collar portion, a third driving apparatus and a fourth driving apparatus arranged on both sides of a second collar portion to alternately insert spokes from inside and outside into spoke holes of the second collar portion, and a first photo-sensor for detecting the coincidence of the driving directions of the first driving apparatus and the second driving apparatus with spoke inserting holes of the first collar portion, and a second photo-sensor for detecting the coincidence of the driving directions of the third driving apparatus and the fourth driving apparatus with spoke inserting holes of the second collar portion, by which the spokes are inserted into the spoke holes of the first collar portion and the second collar portion, characterized in that the driving directions of all the driving apparatuses are directed at a spoke inserting hole located obliquely upwardly of a hub shaft out of all the spoke holes of the first collar portion or the second collar portion to be inserted thereby, a hub supporting apparatus for rotatably supporting a hub provided with collar portions at both ends thereof on the hub shaft and horizontally supporting said hub shaft is provided, said hub supporting apparatus comprising a base, an oblique guide on the base, an upper moving base having a sliding body which slides along said oblique guide, and a supporting arm, and a hub supporting the oblique direction of the oblique guide as a direction for connecting the hub shaft with the spoke inserting hole of the obliquely upward collar portion can be reciprocated in said direction.

According to a second aspect of the present invention, there is provided a spoke inserting apparatus comprising: a first driving apparatus and a second driving apparatus arranged on both sides of a first collar portion of a hub to alternately insert spokes from inside and outside into spoke holes of the first collar portion, a third driving apparatus and a fourth driving apparatus arranged on both sides of a second collar portion to alternately insert spokes from inside and outside into spoke holes of the second collar portion, and a first photo-sensor for detecting the coincidence of the driving directions of the first driving apparatus and the second driving apparatus with spoke inserting holes of the first collar portion, and a second photo-sensor for detecting the coincidence of the driving directions of the third driving apparatus and the fourth driving apparatus with spoke inserting holes of the second collar portion, by which the spokes are inserted into the spoke holes of the first collar portion and the second collar portion, characterized in that the first driving apparatus and the second driving apparatus have their spoke driving directions intersected at a point, the third driving apparatus and the fourth driving apparatus have their spoke driving directions intersected at a point, the first photo-sensor having its optical axis passing through a point of intersection between the spoke driving directions of the first driving apparatus and the second driving apparatus and outputting a signal when said optical axis coincides with the spoke hole, the first photo-sensor having its optical axis passing through a point of intersection between the spoke driving directions of the third driving apparatus and the fourth driving apparatus and outputting a signal when said optical axis coincides with the spoke hole, a spoke entanglement preventive apparatus for transferring a spoke inserted in a half-inserted state into the spoke hole of the hub to a final inserting position is provided, said spoke entanglement preventive apparatus comprising a first spoke handling apparatus disposed externally of the first collar portion and a second spoke handling portion disposed externally of the second collar portion, said first spoke handling apparatus comprising a turning arm which turns within a vertical plane parallel with the hub shaft and a rod-like pull-in piece provided at an extreme end of said turning arm, the turning direction of said turning arm being set outwardly in an axial direction of the hub upwardly of a turning track, said pull-in piece being positioned so as to be placed in contact from the bottom with the vicinity of the extreme end of the spoke inserted into the first collar portion by the first driving apparatus and the spoke inserted into the second collar portion by the fourth driving apparatus upwardly of the turning track, said second spoke handling apparatus comprising a turning arm which turns within a vertical plane parallel with the hub shaft and a rod-like pull-in piece provided at an extreme end of said turning arm, the turning direction of said turning arm being set outwardly in an axial direction of the hub upwardly of a turning track, said pull-in piece being positioned so as to be placed in contact from the bottom with the vicinity of the extreme end of the spoke inserted into the second collar portion by the third driving apparatus and the spoke inserted into the first collar portion by the second driving apparatus upwardly of the turning track, a supporting apparatus for the driving apparatus is provided, said supporting apparatus determining a relative position and a relative attitude of the first driving apparatus, the second driving apparatus, the first photo-sensor and the first spoke handling apparatus, and determining a relative position and a relative attitude of the third driving apparatus, the fourth driving apparatus, the second photo-sensor and the second spoke handling apparatus, the first driving apparatus, the second driving apparatus, the first photo-sensor and the first spoke handling apparatus, and the third driving apparatus, the fourth driving apparatus, the second photo-sensor and the second spoke handling apparatus being placed integral with each other and capable of being reciprocated in an axial direction of the hub and symmetrically. The "reciprocating symmetrically" termed in the present specification means that when one moves in a given direction, the other moves by the same distance in a direction opposite to said one.

According to a third aspect of the present invention, there is provided a spoke inserting apparatus comprising: a first driving apparatus and a second driving apparatus arranged on both sides of a first collar portion of a hub to alternately insert spokes from inside and outside into spoke holes of the first collar portion, a third driving apparatus and a fourth driving apparatus arranged on both sides of a second collar portion to alternately insert spokes from inside and outside into spoke holes of the second collar portion, and a first photo-sensor for detecting the coincidence of the driving directions of the first driving apparatus and the second driving apparatus with spoke inserting holes of the first collar portion, and a second photo-sensor for detecting the coincidence of the driving directions of the third driving apparatus and the fourth driving apparatus with spoke inserting holes of the second collar portion, by which the spokes are inserted into the spoke holes of the first collar portion and the second collar portion, characterized in that the driving directions of all the driving apparatuses are directed at a spoke inserting hole located obliquely upwardly of a hub shaft out of all the spoke holes of the first collar portion or the second collar portion to be inserted thereby, a hub supporting apparatus for rotatably supporting a hub provided with collar portions at both ends thereof on the hub shaft and horizontally supporting said hub shaft is provided, said hub supporting apparatus comprising a base, an oblique guide on the base, an upper moving base having a sliding body which slides along said oblique guide, and a supporting arm, and a hub supporting the oblique direction of the oblique guide as a direction for connecting the hub shaft with the spoke inserting hole of the obliquely upward collar portion can be reciprocated in said direction, and that the first driving apparatus and the second driving apparatus have their spoke driving directions intersected at a point, the third driving apparatus and the fourth driving apparatus have their spoke driving directions intersected at a point, the first photo-sensor having its optical axis passing through a point of intersection between the spoke driving directions of the first driving apparatus and the second driving apparatus and outputting a signal when said optical axis coincides with the spoke hole, the first photo-sensor having its optical axis passing through a point of intersection between the spoke driving directions of the third driving apparatus and the fourth driving apparatus and outputting a signal when said optical axis coincides with the spoke hole, a spoke entanglement preventive apparatus for transferring a spoke inserted in a half-inserted state into the spoke hole of the hub to a final inserting position is provided, said spoke entanglement preventive apparatus comprising a first spoke handling apparatus disposed externally of the first collar portion and a second spoke handling portion disposed externally of the second collar portion, said first spoke handling apparatus comprising a turning arm which turns within a vertical plane parallel with the hub shaft and a rod-like pull-in piece provided at an extreme end of said turning arm, the turning direction of said turning arm being set outwardly in an axial direction of the hub upwardly of a turning track, said pull-in piece being positioned so as to be placed in contact from the bottom with the vicinity of the extreme end of the spoke inserted into the first collar portion by the first driving apparatus and the spoke inserted into the second collar portion by the fourth driving apparatus upwardly of the turning track, said second spoke handling apparatus comprising a turning arm which turns within a vertical plane parallel with the hub shaft and a rod-like pull-in piece provided at an extreme end of said turning arm, the turning direction of said turning arm being set outwardly in an axial direction of the hub upwardly of a turning track, said pull-in piece being positioned so as to be placed in contact from the bottom with the vicinity of the extreme end of the spoke inserted into the second collar portion by the third driving apparatus and the spoke inserted into the first collar portion by the second driving apparatus upwardly of the turning track, a supporting apparatus for the driving apparatus is provided, said supporting apparatus determining a relative position and a relative attitude of the first driving apparatus, the second driving apparatus, the first photo-sensor and the first spoke handling apparatus, and determining a relative position and a relative attitude of the third driving apparatus, the fourth driving apparatus, the second photo-sensor and the second spoke handling apparatus, the first driving apparatus, the second driving apparatus, the first photo-sensor and the first spoke handling apparatus, and the third driving apparatus, the fourth driving apparatus, the second photo-sensor and the second spoke handling apparatus being placed integral with each other and capable of being reciprocated in an axial direction of the hub and symmetrically.

The operation for the aforementioned means will be described in order. In the spoke inserting apparatus according to the present invention, a hub 2 is supported in a horizontal attitude in the center of the apparatus. The driving directions of a first driving apparatus 11 and a second driving apparatus 12 are directed at an obliquely upward spoke inserting hole out of all the spoke holes 6 of a first collar portion 2, and the driving directions of a third driving apparatus 13 and a fourth driving apparatus 14 are directed at the same obliquely upward spoke inserting hole out of all the spoke holes 7 of a second collar portion 3. The hub 1 is rotated to successively insert spokes 20 into spoke holes 6, 7 coincided with the driving directions of the first driving apparatus 11, the second driving apparatus 12, and the third driving apparatus 13 and the fourth driving apparatus 14. Therefore, in the case where the diameters of the first collar portion 2 and the second collar portion 3 of the hub I are different, the driving directions of the first driving apparatus 11 to the fourth driving apparatus 14 are adjusted to be directed at the spoke inserting holes of the collar portions 2 and 3 individually, or a vertical moving mechanism 118 and a lateral moving mechanism 119 are provided on a hub supporting apparatus 117 (see FIG. 12) so that the hub 1 is moved in the vertical direction and in the lateral direction within a plane vertical to the direction of the hub shaft 4 to coincide the spoke inserting holes of the first and second collar portion 2, 3 with points of intersections 8, 9 in the spoke driving direction. In the spoke inserting apparatus according to the first aspect, there is provided a mechanism provided through an oblique guide 28 and a sliding body 29 slidably combined with a lower base 26 and an upper moving base 27 of a hub supporting apparatus, and the oblique direction of the oblique guide 28 is set to be parallel with the direction for connecting the center of each collar portion of the hub 1 with the spoke inserting hole, and the hub 1 supported by supporting arms 21, 22 connected to the moving base 27 is slidably moved upward. Therefore, the spoke inserting holes of the first collar portion 2 and the second collar portion 3 can be coincided with the point of intersections 8, 9 in the spoke driving direction by the single operation for reciprocating the hub 1 in the direction passing through the center of the first collar portion 2 and the second collar portion 3 and the spoke inserting holes.

In the spoke inserting apparatus according to the second aspect, the following function can be exhibited.

(1) Similarly to the aforementioned prior art (see FIG. 12), the first driving apparatus 11 and the second driving apparatus 12 have their spoke driving directions intersected at one point, and the first photo-sensor 16 outputs a signal in the state in which the optical axis thereof passes through the point of intersection 8 and coincides with so that the optical axis coincides with the spoke hole 6. It is adjusted so that the point of intersection 8 is adjusted to the spoke inserting hole of the first collar portion 2 of the supported hub 1 whereby when the first photo-sensor 16 detects the spoke hole 6, the rotation of the hub 1 is stopped, and the spoke 20 can be inserted into the spoke hole 6 by the first driving apparatus 11 or the second driving apparatus 12. In this manner, the hub 1 is rotated by an angle corresponding to one pitch of the spoke hole 6, and every stop the first driving apparatus 11 and the second driving apparatus 12 alternately insert the spokes 10 to complete the insertion of spokes into all the spoke holes 6. The third driving apparatus 13, the fourth driving apparatus 14 and the second photo-sensor 17 relative to the second collar portion 3 function similarly.

(2) In the spoke entanglement preventive apparatus, the pull-in pieces 64, 72 are placed in contact from the bottom with the vicinity of the extreme end of the spoke 20 in the half-inserted state, and the pull-in pieces 64, 72 are turned in the direction substantially equal to the spoke inserting direction to remove and move the spoke 20 to the completely inserting position. The spoke entanglement preventive apparatus comprises the first spoke handling apparatus 18 disposed externally of the first collar portion 2 for handling the spoke 20 inserted into the first collar portion 2 by the first driving apparatus 11 and the spoke 20 inserted into the second collar portion 3 by the fourth driving apparatus 14, and the second spoke handling apparatus 19 disposed externally of the second collar portion 3 for handling the spoke 20 inserted into the second collar portion 3 by the third driving apparatus 12 and the spoke 20 inserted into the first collar portion 2 by the second driving apparatus 12. Therefore, the spokes 20 driven by all the driving apparatuses can be handled by the minimum number of spoke handling apparatuses to simplify the entire apparatus.

(3) In the supporting apparatus, the relative position and the relative attitude of the first driving apparatus 11, the second driving apparatus 12 and the first photo-sensor 16 are determined to establish one set (hereinafter abbreviated as one set for insertion into the first collar portion 2), and the relative position and the relative attitude of the third driving apparatus 13, the fourth driving apparatus 14 and the second photo-sensor 17 are determined to establish one set (hereinafter abbreviated as one set for insertion into the second collar portion 3), whereby one set for insertion into the first collar portion 2 and one set for insertion into the second collar portion 3 are integrated to enable reciprocation parallel with and symmetrical with the hub shaft 4. Therefore, even with respect to the hub 1 in which the spacing between the first collar portion 2 and the second collar portion 3 is different, when the hub 1 is set to the hub supporting apparatus 10 with the center set to a fixed position, the movement of the two sets in the direction of the hub shaft and in a symmetrical manner causes the driving direction of the first driving apparatus 11 and the second driving apparatus 12 and the point of intersection 8 of the optical axis of the first photo-sensor 16 to coincide with the spoke inserting hole of the first collar portion 2, and causes the driving direction of the third driving apparatus 13 and the fourth driving apparatus 14 and the point of intersection 9 of the optical axis of the second photo-sensor 17 to coincide with the spoke inserting hole of the second collar portion 3.

(4) As described above, one set for insertion into the first collar portion 2 and one set for insertion into the second collar portion 3 are moved parallel with and symmetrical with the hub shaft 4 about the hub 1 corresponding to the hub 1 in which the spacing between the first collar portion 2 and the second collar portion 3 is different. And, the first spoke handling apparatus 18 is made integral with one set for insertion into the first collar portion 2 and the second spoke handling apparatus 19 is made integral with one set for insertion into the second collar portion 3 for movement so that the spacing between the first spoke handling apparatus 18 and the first collar portion 2 and the spacing between the second spoke handling apparatus 19 and the second collar portion 3 are fixed whereby the half-inserted spokes 20 in the spoke holes 6, 7 of the first collar portion 2 and the second collar portion 3 can be handled in a stable manner. Accordingly, the positions of the first spoke handling apparatus 18 and the second spoke handling apparatus 19 are not necessary to be adjusted separately with the movement of the apparatuses adjusted to the size of the hub 1.

In the spoke inserting apparatus according to the third aspect, the spoke inserting apparatus according to the first aspect and the spoke inserting apparatus according to the second aspect are combined, and therefore, the spoke inserting apparatus according to the third aspect has all the aforementioned functions. That is, the spoke inserting apparatus can be suited for all the sizes of the hub different in the pitches of the spoke holes 6, 7, the spacing between the first collar portion 2 and the second collar portion 3, and the diameter of the first collar portion 2 and the second collar portion 3.

BRIEF DESCRIPTION OF THE DRAWINGS

FIGS. 8(a), 8(b) and 8(c) are respectively explanatory views of the state of inserting spokes into a hub, FIG. 8(a) showing a half-inserted state, FIG. 8(b) showing a completely-inserted state, and FIG. 8(c) showing the state in which spokes are inserted into all the spoke holes;

FIG. 9 is a perspective view for explaining the function of a spoke handling apparatus;

DETAILED DESCRIPTION OF THE PREFERRED EMBODIMENTS

Figure 1:
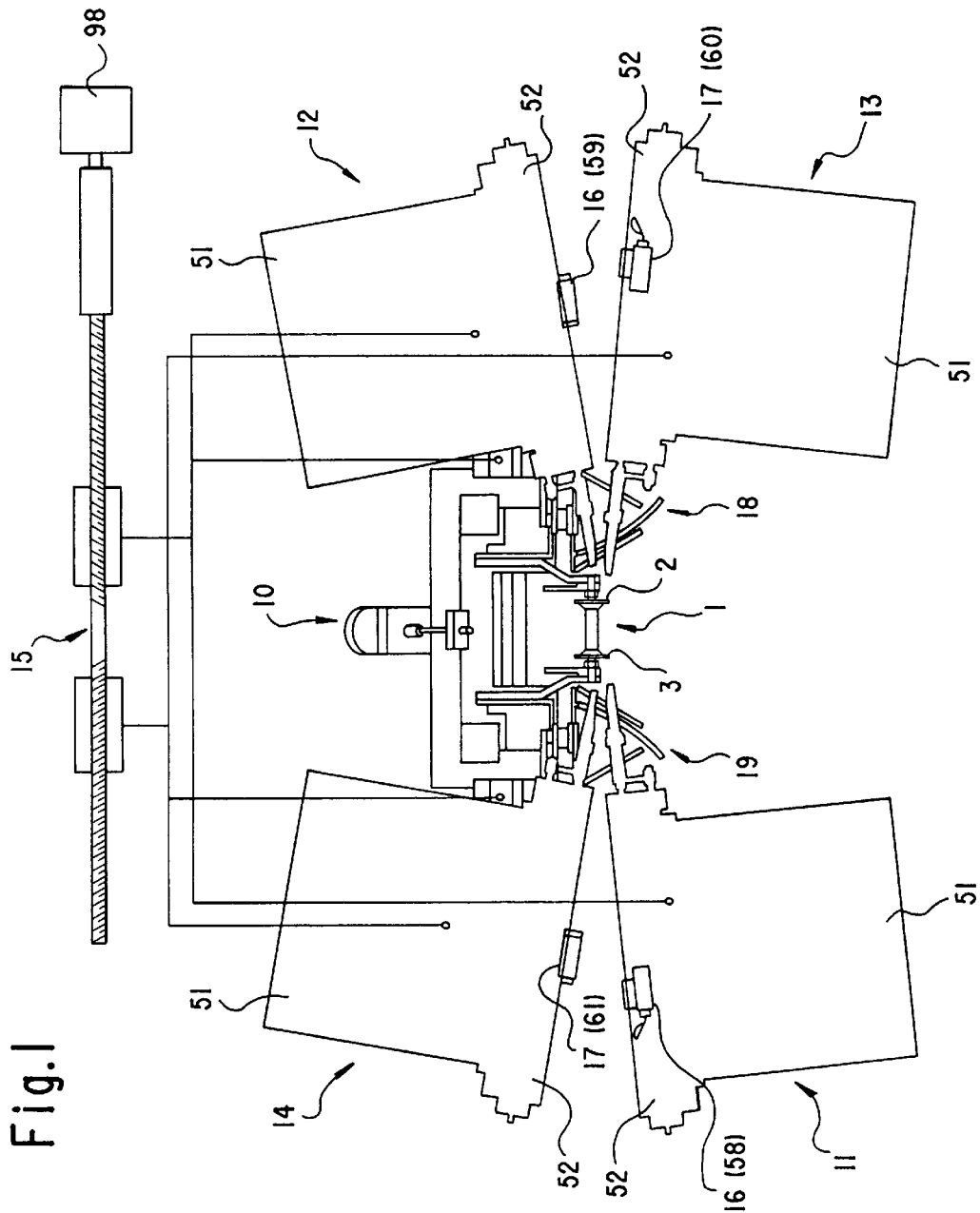
FIG. 1 is a schematic plan view of a spoke inserting apparatus according to the present invention.
Figure 2:
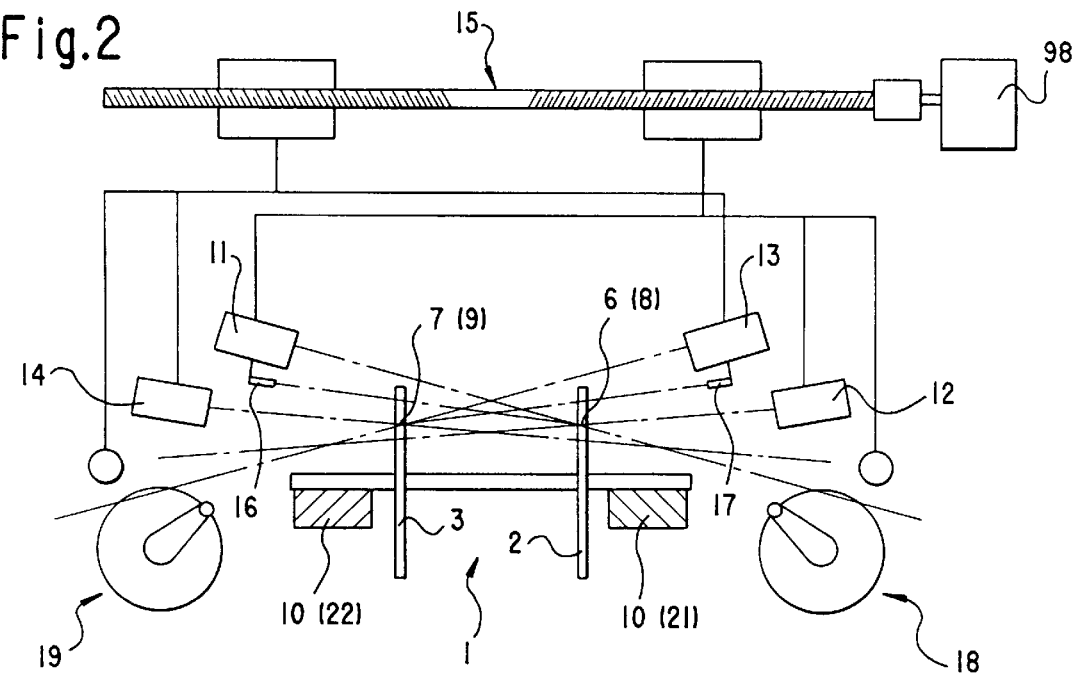
FIG. 2 is a schematic front view showing the spoke inserting apparatus of FIG. 1.
Figure 3:
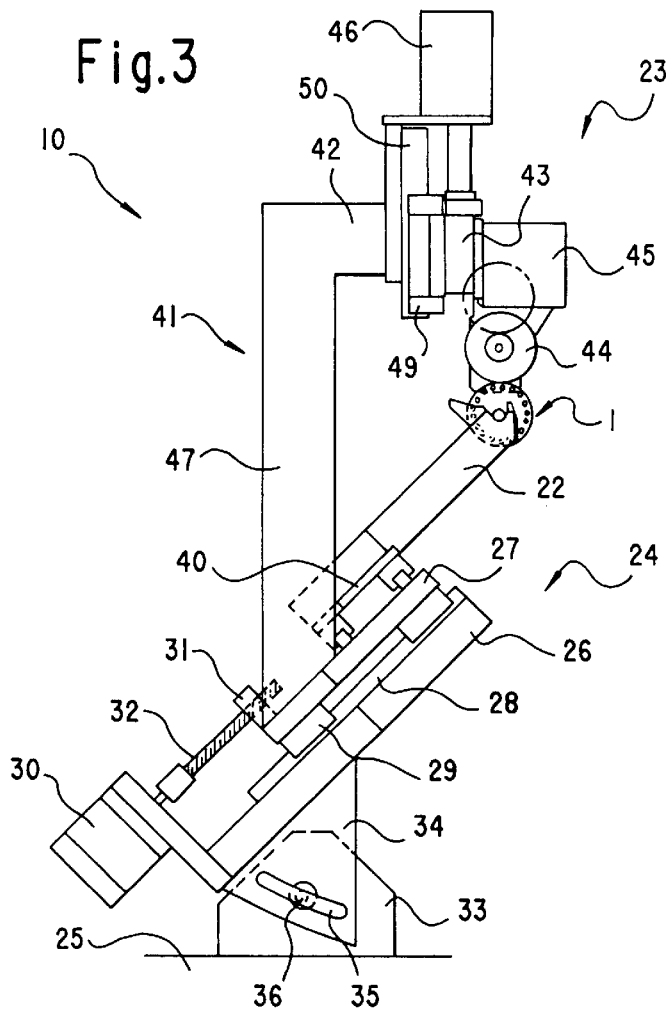
FIG. 3 is a side view showing a hub supporting apparatus of the spoke inserting apparatus of FIG. 1.
Figure 4:
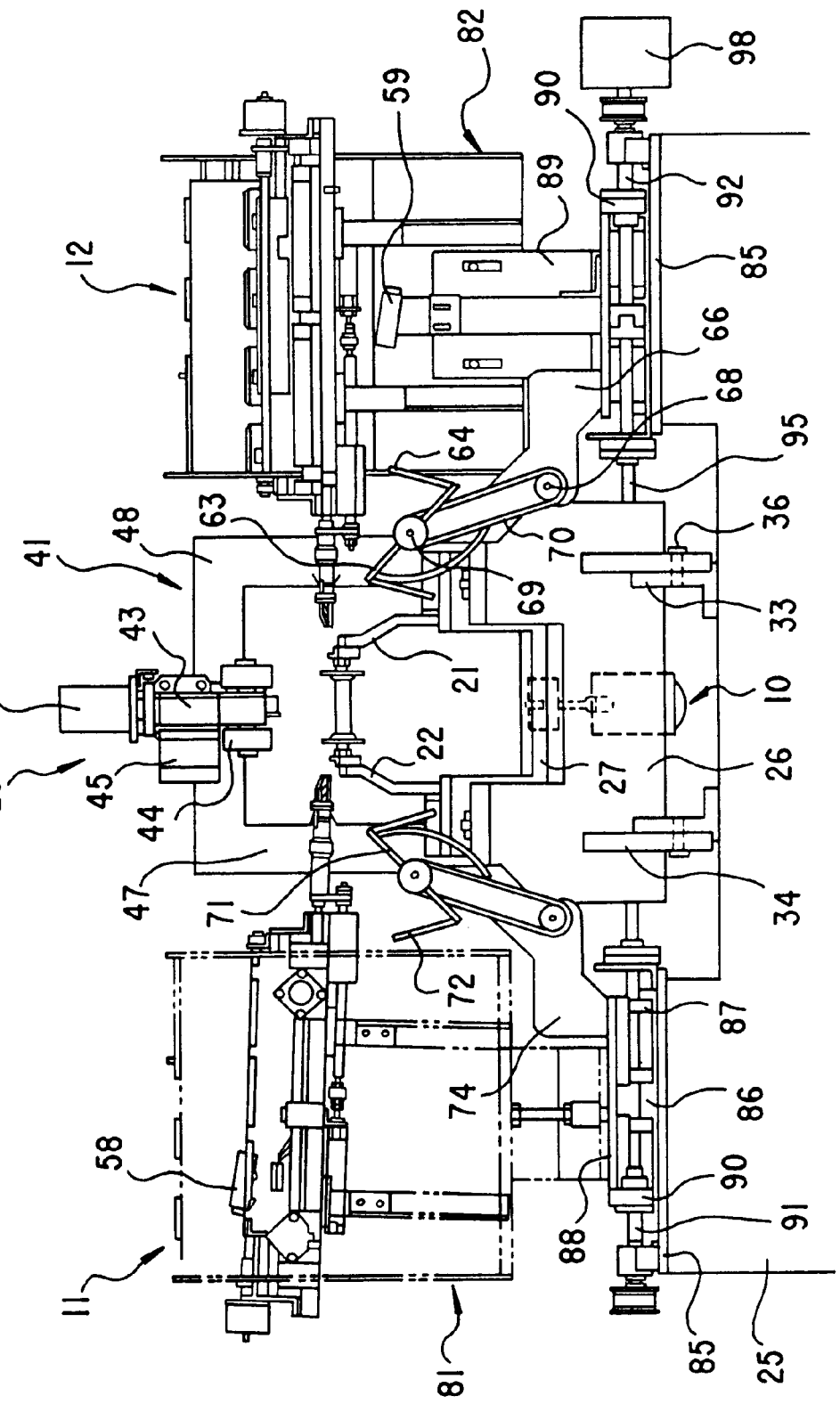
FIG. 4 is a front view showing a first driving apparatus and a second driving apparatus, and a first supporting portion and a second supporting portion of the spoke inserting apparatus of FIG. 1.
Figure 5:
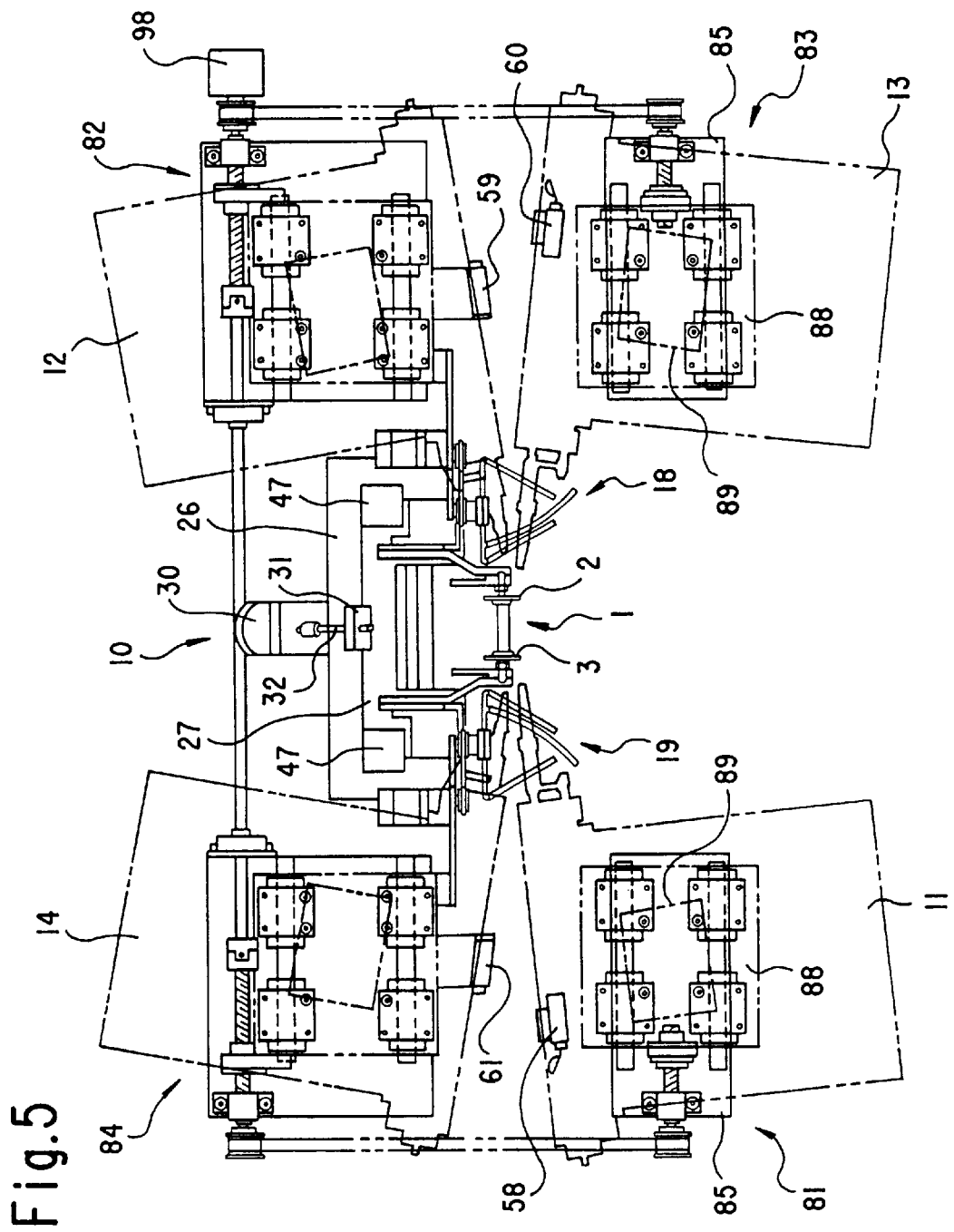
FIG. 5 is a plan view showing, with parts above a moving base for a supporting apparatus of the spoke inserting apparatus of FIG. 1 omitted, the driving apparatus and supporting instruments therefor by the two-dot chain lines and the moving base by the three-dot chain lines.
Figure 6:
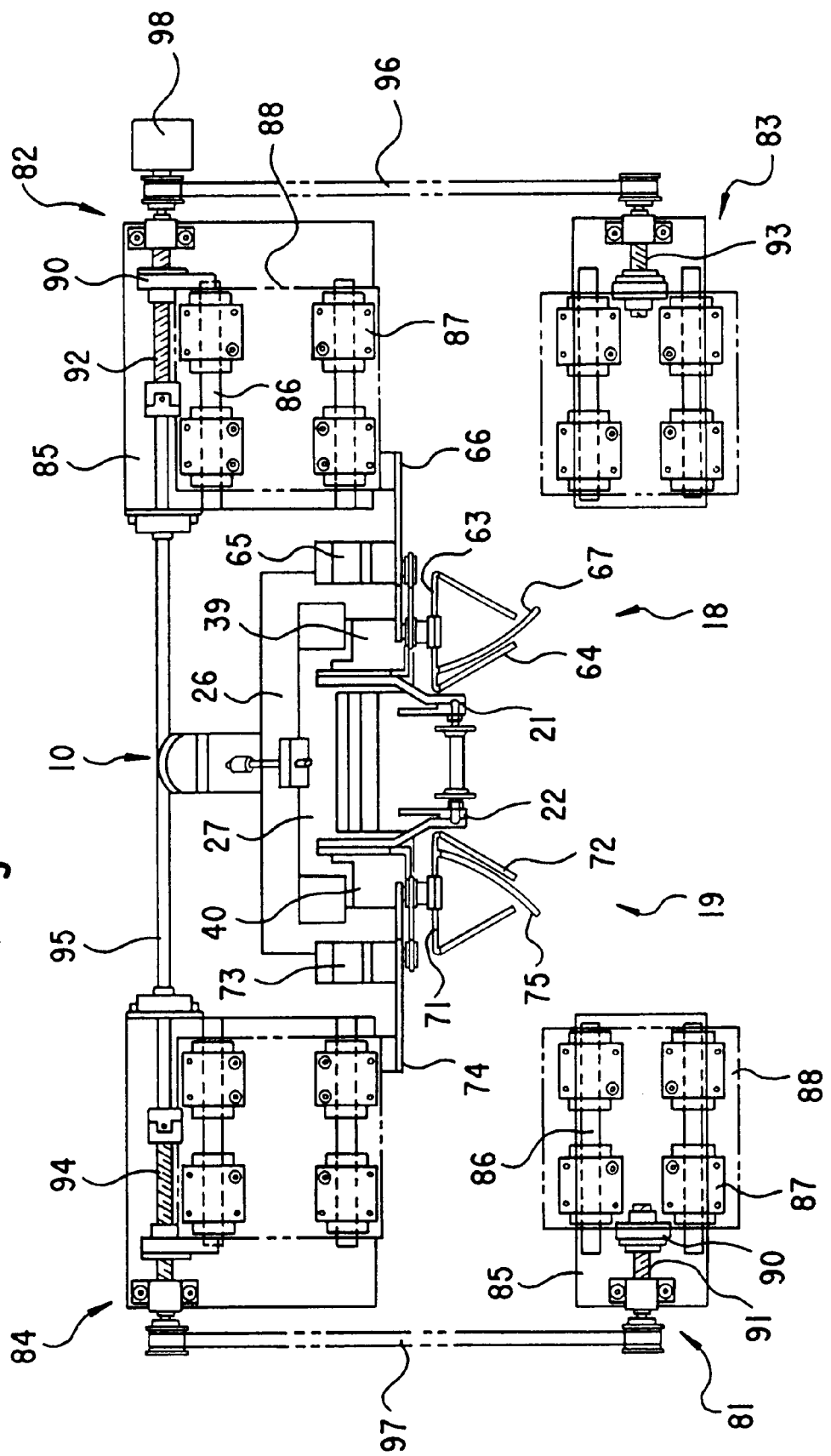
FIG. 6 is a plan view of a lateral sliding mechanism of each driving apparatus of the spoke inserting apparatus of FIG. 1.
Figure 7:
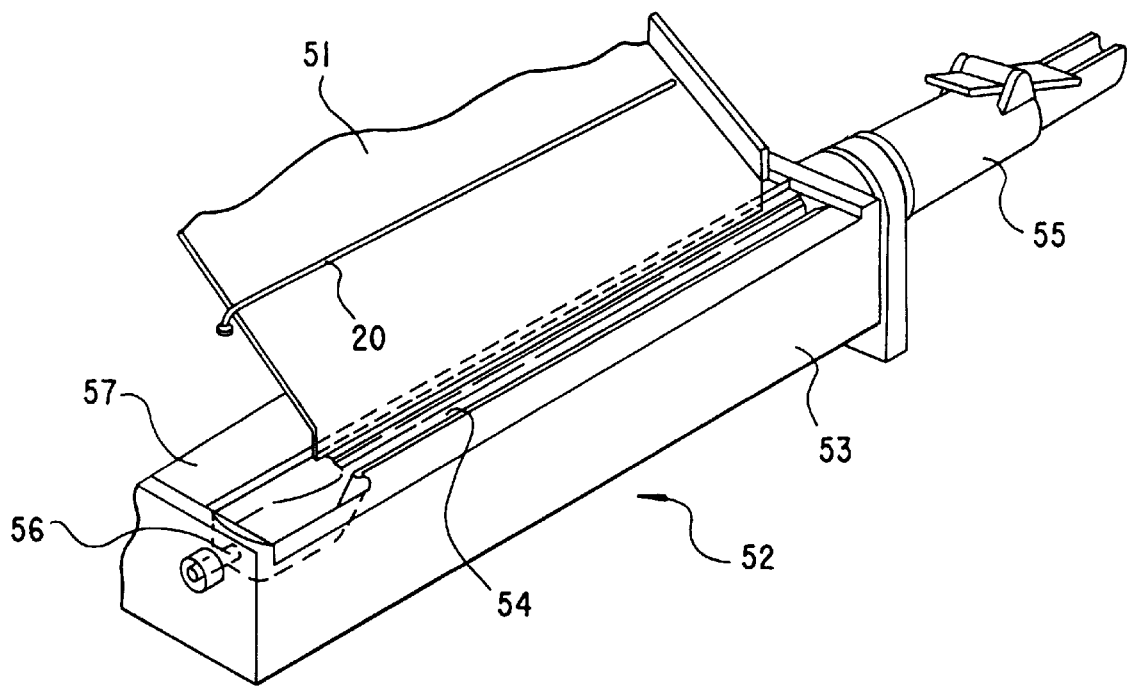
FIG. 7 is a perspective view of the driving apparatus of the spoke inserting apparatus of FIG. 1.
Figure 10A:
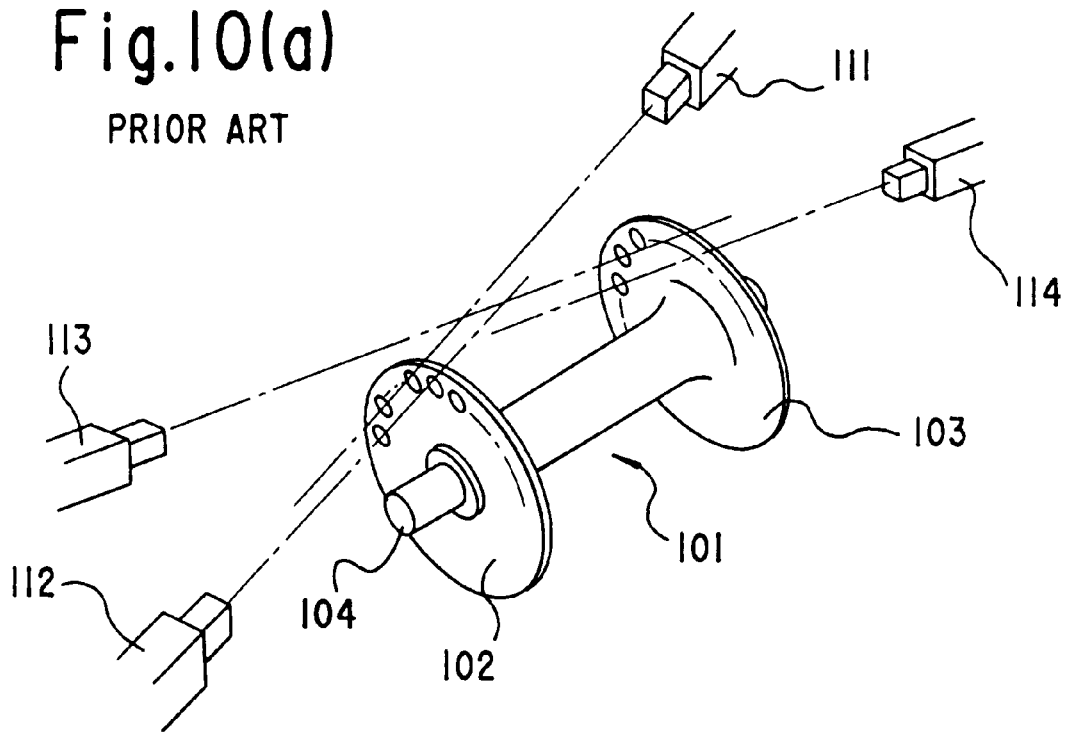
FIGS. 10(a) is a schematic perspective view of a conventional spoke inserting apparatus.
Figure 10B:
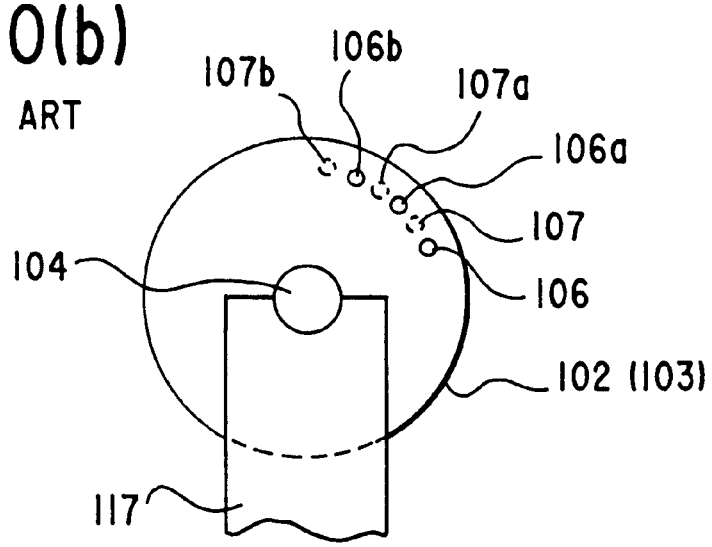
FIG. 10(b) is a side view of a hub supporting apparatus for supporting a hub.
Figure 11:
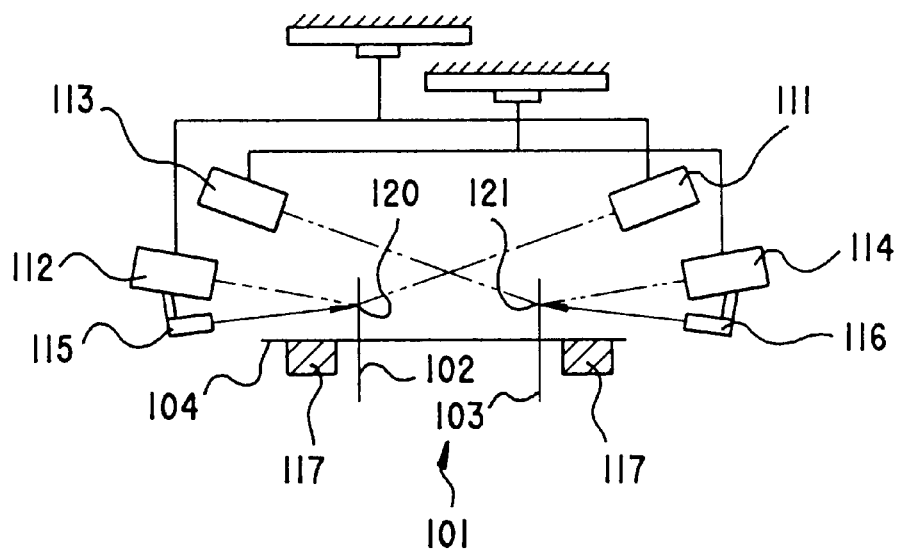
FIG. 11 is a schematic explanatory view of a conventional spoke inserting apparatus.
Figure 12:
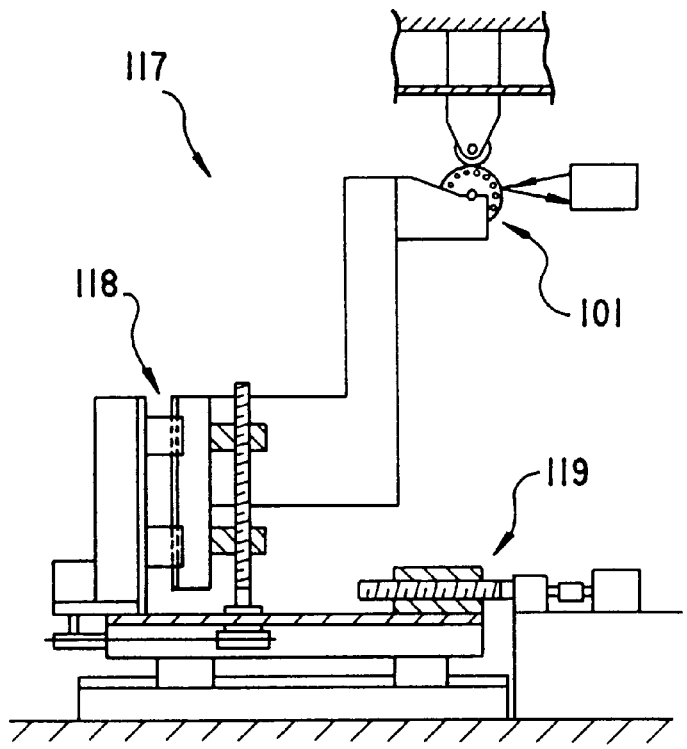
FIG. 12 is a side view showing a hub supporting apparatus of the conventional spoke inserting apparatus of FIG. 11.

FIGS. 1 to 8 show one form of the embodiment of the invention. FIG. 1 is a schematic plan view of a spoke inserting apparatus according to the one form; FIG. 2 is a schematic front view showing the spoke inserting apparatus of FIG. 1; FIG. 3 is a side view showing a hub supporting apparatus of the spoke inserting apparatus of FIG. 1; FIG. 4 is a partial front view showing the spoke inserting apparatus of FIG. 1; FIG. 5 and FIG. 6 are respectively a partial plan view showing the spoke inserting apparatus of FIG. 1; FIG. 7 is a schematic perspective view for explaining the spoke inserting apparatus of FIG. 1; FIG. 8(a) is an explanatory view showing a spoke 20 in a half-inserted state, FIG. 8(b) is an explanatory view showing the spoke 20 in a completely-inserted state, and FIG. 8(c) is an explanatory view showing the state in which the spokes 20 are completely inserted into all the spoke holes 6, 7; and FIG. 9 is an explanatory view a spoke handling apparatus. For better understanding of the drawing, FIG. 4 shows only the parts relating to the first driving apparatus 11 and the second driving apparatus for inserting the spokes 20 into the first collar portion 2 of the hub 1, and omits the parts relating to the third driving apparatus 13 and the fourth driving apparatus 14, a feeder 51 of the first driving apparatus 11 being indicated by an imaginary line (two-dot line). FIG. 5 shows contours of the driving apparatuses 11 to 14 and their supporting means 89 by two-dot chain lines, a moving stand 88 of the supporting apparatus 15 is indicated by the 3-dot chain lines, and the driving directions of the driving apparatuses 11 to 14 and the optical axis of the photo-sensors 16, 17 are indicated by the one-dot chain lines. FIG. 6 omits parts above the moving stand 88 of supporting portions 81 to 84 for explaining a sliding mechanism of the driving apparatuses 11 to 14. The spoke inserting apparatus comprises, as shown in FIGS. 1 to 5, a hub supporting apparatus 10, a first driving apparatus 11, a second driving apparatus 12, a third driving apparatus 13, a fourth driving apparatus 14, a supporting apparatus 15, a first photo-sensor 16, a second photo-sensor 17, a first spoke handling apparatus 18 and a second spoke handling apparatus 19. In the following, various constituent parts will be described in order, and the function of the spoke inserting apparatus will be also described. Note, a lateral direction in the description of the present specification indicates a direction parallel with the shaft of the hub 1 supported on the spoke inserting apparatus, and a longitudinal direction indicates a direction vertical to and horizontal to the shaft of the hub 1.

A hub supporting apparatus 10 supports a hub 1 substantially in the center of the hub supporting apparatus, as shown in FIGS. 1 to 5. More specifically, both ends of a hub shaft 4 are supported in a horizontal and lateral direction by a pair of supporting arms 21, 22, the hub 1 is made rotatable about the hub shaft by a rotating mechanism an 23, and the hub 1 is made reciprocative in an upward direction by 45° obliquely (hereinafter merely referred to as forward-upward 45°) as the forward as a reference without changing the attitude thereof. The sliding mechanism 24 comprises a base bed 26 provided between the supporting arms 21, 22 and a horizontal base 25 and being connected to the base 25, a moving bed 27 connected to the supporting arms 21, 22 and disposed parallel with the base bed 26, an oblique guide 28 provided on the upper surface of the base bed 26, and a sliding body 29 provided on the lower surface of the moving bed 27 and slidably combined with the oblique guide 28, and further comprises a motor 30 provided at the rear end of the base bed 26, and a feed screw 32 rotatably driven by the motor 30 and extended through and screwed into a female-thread plate 31 vertically provided at the rear end of the moving bed 27, the oblique movement of the moving bed 27 being controlled by the motor. The oblique guide 28 in the present embodiment comprises a rail.

The base bed 26 is connected to the base 25 by placing a pair of segment plates 34 stood upright on the bottom of the base bed 26 and parallel to each other on a pair of angle plates 33 stood upright vertically to the base 25 and parallel to each other, and inserting a bolt 36 into a circular slit 35 opening to the segment plate 34, the bolt 36 being threadedly fitted into each of the angle plates 33. The angle plate 33 is stood upright in a laterally symmetrical position with the center of the spoke inserting apparatus being a reference. The center of the circular slit 35 is a spoke inserting hole at forward-upward 45° out of all the spoke holes 6, 7 of the hub 1 supported on the supporting arms 21, 22. Therefore, the optimum position (obliquely upward angle) of the spoke inserting hole is slightly displaced every hub 1 of various shapes, but an angle of inclination of the base bed 26 can be changed while being adjusted to the position of the spoke inserting hole to correspond the sliding direction of the hub 1 to the position of the spoke inserting hole.

The base bed 26 is a substantially square plate having a recessed notch in one side thereof, which is fixed with the recessed cut side directed forwardly and inclined forward-upward 45°. The moving bed 27 is likewise a substantially square plate having a recessed notch in one side thereof, which is fixed with the recessed cut side directed forwardly and inclined forward-upward 45°. However, the moving bed is thinner and smaller than the base bed 26. The oblique guide 28, the sliding body 29 and the feed screw 32 are provided while being directed longitudinally and inclined forward-upward 45° similarly to the base bed 26 and the moving bed 27. Accordingly, when the feed screw 32 is rotatably driven by the motor 30, the female-thread plate 31 extended through and threadedly fitted in the feed screw 32 and the moving bed 27 secured to the female-thread plate 31 can be reciprocated in the direction of forward-upward 45°. Accordingly, the supporting arms 21, 22 connected to the moving bed 27 and the hub 1 supported on the supporting arms 21, 22 can be reciprocated in the direction of forward-upward 45°. Note, the recessed notch provided in the base bed 26 and the moving bed 27 is provided so as not to come in contact with the spoke 20 inserted into the hub 1 supported upward and hung down. The supporting arms 21, 22 are connected to the moving bed 27 by providing supporting beds 39, 40 on the upper surface of the moving bed 27 reciprocally in the lateral direction, and securing the supporting arms 21, 22 to the supporting beds 39, 40.

The rotating mechanism 23 comprises a roller supporting bed 41, a supporting beam 42, a roller connecting body 43, a pair of hub rotating rollers 44, a motor 45 and an air cylinder 46. The roller supporting bed is in a gate-like bed formed from a square rod, and comprises a pair of legs 47 stood upright vertically on the moving bed 27, and a beam 48 extended between upper ends of the legs 47. The supporting beam 42 is a short square rod and is provided horizontally from the central portion of the beam 48 of the roller supporting bed 41 to the forward. The roller connecting body 43 is connected by slidably combining a sliding body 49 provided on the side thereof with a rail 50 provided vertically at the extreme end of the supporting beam 42, the roller connecting body 43 being movable vertically by the air cylinder secured to the extreme end of the supporting beam 42 (shown by the imaginary line (two-dot chain line) in FIG. 3). The pair of hub rotating rollers 44 are rotatably provided on the roller connecting body 43 and is likewise connected to the motor 45 provided on the roller connecting body 43 for rotation. The hub rotating roller 44 is provided symmetrically to right and left apart by the same degree as the spacing between both the collar portions 2, 3 of the hub 1 with its rotating shaft directed in the lateral direction so as to enable contact with both the collar portions 2, 3 of the lower hub 1 supported on the supporting arms 21, 22.

The first driving apparatus 11, the second driving apparatus 12, the third driving apparatus 13, and the fourth driving apparatus 14 have the same construction, which comprise a feeder 51 for stocking spokes 20, and a driving machine 52 for driving the spokes 20 one by one, as shown in FIGS. 1, 2, 4 and 5. The driving machine 52 comprises, as shown in FIG. 7, a body 53, a groove 54 provided in the body 53, a nozzle 55 in communication with one end of the groove 54, an air outlet 56 in communication with the other end of the groove 54, and a groove cover 57 provided closeable on the upper surface of the groove 54. The groove 54 is an elongated space for receiving one spoke 20. The groove cover 57 is designed to be opened when the spoke 20 is set and to be closed during the driving. The air outlet 56 is provided with an air pressure source for causing pressure air to flow into the groove 54 and a pressure air control unit. Accordingly, after the groove cover 57 is opened to set the spoke 10 to the groove 53 from the feeder 51, the groove cover 57 is closed to discharge compressed air into the groove 53 from the air outlet 56 whereby the spoke 20 can be driven from the nozzle 54. These first to fourth driving apparatuses 11, 14 are supported from the bottom by the supporting apparatus 15 laid on the base 25 and disposed such that two of them are positioned on both left and right sides of the hub 1 supported by the hub supporting apparatus 10. More specifically, the first driving apparatus 11 is provided to insert the spoke 20 from inside to outside into the spoke hole 6 of the first collar portion 2 on the right side of the hub 1, the first driving apparatus 11 being disposed on the left side and forwardly of the spoke inserting apparatus, the driving direction thereof being directed somewhat rearward with the right direction being a reference. The second driving apparatus 12 is provided to insert the spoke 20 from outside to inside into the spoke hole 6 of the first collar portion 2 on the right side of the hub 1, the second driving apparatus 12 being disposed on the left side and rearwardly of the spoke inserting apparatus, the driving direction thereof being directed somewhat forward with the left direction being a reference. The third driving apparatus 13 is provided to insert the spoke 20 from inside to outside into the spoke hole 7 of the second collar portion 3 on the left side of the hub 1, the third driving apparatus 13 being disposed on the right side and forwardly of the spoke inserting apparatus, the driving direction thereof being directed somewhat rearward with the left direction being a reference. The fourth driving apparatus 14 is provided to insert the spoke 20 from outside to inside into the spoke hole 7 of the second collar portion 3 on the left side of the hub 1, the fourth driving apparatus 14 being disposed on the left side and rearwardly of the spoke inserting apparatus, the driving direction thereof being directed somewhat forward with the right direction being a reference. As shown in FIG. 3, the second driving apparatus 12 and the fourth driving apparatus 14 for inserting the spokes 20 from outside to inside into the collar portions 2, 3 have their driving direction to be substantially horizontal, and the first driving apparatus 11 and the third driving apparatus 13 for inserting the spokes 20 from inside to outside are disposed slightly upwardly of the second driving apparatus 12 and the fourth driving apparatus 14 and their driving direction is directed slightly obliquely downward. Thereby, the spokes driven by the first to fourth driving apparatuses 11 to 14 are hard to be entangled and are not in contact with the collar portions 3 or 2 opposite to the first collar portion 2 or the second collar portion 3.

Further, as shown in FIG. 2, the driving direction of the first driving apparatus 11 and the driving direction of the second driving apparatus 12 are fixed in relative position and attitude so as to intersect at the spoke inserting hole (point of intersection 8) at forward-upward 45° with the hub shaft 4 out of all the spoke holes 6 in the first collar portion 2 of the hub 1 supported by the hub supporting apparatus 10. The driving directions of the third driving apparatus 13 and the fourth driving apparatus 14 are likewise fixed in relative position and attitude so as to intersect at the spoke inserting hole (point of intersection 9) at forward-upward 45° with the hub shaft 4 out of all the spoke holes 7 in the first collar portion 3 of the hub 1. As shown in FIG. 4, the driving apparatuses 11 to 14 are supported by supporting means 89 located therebelow, and a rail 86 and a sliding body 87 are provided between the moving bed 88 on the lower surface of the supporting means 89 and the fixed bed on the upper surface of the base 25 so that they are slidable (described later).

A first photo-sensor 16 is a photo-electric switch, which is provided with a projector 58 mounted on the first driving apparatus 11 and a receiver 59 mounted on the second driving apparatus 12, and the position and direction are set so that the optical axis from the projector 58 to the receiver 59 passes through the point of intersection 8 in the driving direction of the first driving apparatus 11 and the second driving apparatus 12. A second photo-sensor 17 is also a photo-electric switch, which is provided with a projector 60 mounted on the third driving apparatus 13 and a receiver 61 mounted on the fourth driving apparatus 14, and the position and direction are set so that the optical axis from the projector 60 to the receiver 61 passes through the point of intersection 9 in the driving direction of the third driving apparatus 13 and the fourth driving apparatus 14, similarly to the first photo-sensor 14.

The spokes 20 driven by the first driving apparatus 11 to the fourth driving apparatus 14 often assume the state that the spokes are half-inserted into the spoke holes 6, 7 of the first collar portion 2 and the second collar portion 3 of the hub 1, that is, the half-inserted state as shown in FIG. 8(a). In this half-inserted state, the spokes 20 drop during transportation to the succeeding process or an inconvenience occurs during the operation in the succeeding process. The first spoke handling apparatus 18 and the second spoke handling apparatus 19 are provided to pull the half-inserted spokes 20 into the bended head portion to render them the state in which the extreme end thereof is hung down, that is, the completely inserted state as shown in FIG. 8(b). Accordingly, if the first spoke handling apparatus 18 and the second spoke handling apparatus 19 are used, when all the spokes are completely inserted, all the spokes 20 are directed parallel and vertically downward to assume the stable state, not obstructing the transportation to the succeeding process. The first spoke handling apparatus 18 is disposed axially externally of the first collar portion 2 and slightly downward to pull into the completely inserted state the spokes 20 inserted from inside into the first collar portion 2 by the first driving apparatus 11 and the spokes 20 inserted from outside into the second collar portion 3 by the fourth driving apparatus 14. Further, the second spoke handling apparatus 19 is disposed axially externally of the second collar portion 3 to pull into the completely inserted state the spokes 20 inserted from inside into the second collar portion 3 by the third driving apparatus 13 and the spokes 20 inserted from outside into the first collar portion 2 by the second driving apparatus 12.

The first spoke handling apparatus 18 and the second spoke handling apparatus 19 comprise, as shown in FIGS. 4, 6 and 9, a turning arm 63, a pull-in piece 64, a motor 65, a connecting plate 66, a pull-in pipe 67, etc. The turning arm 3 is in the form of a rod, which is rotatably supported at its center on the connecting plate 66, and the rotating track thereof is in a vertical plane parallel to the hub shaft 4 of the hub 1 supported on the hub supporting device 1. The motor 5 is also supported on the connecting plate 66, and a belt 70 is extended between a pulley 68 provided on a rotating shaft of the motor 65 and a pulley 69 provided on a rotating shaft of the turning arm 63 so that the turning arm 63 is driven whereby the latter is turned axially outwardly of the hub 1. The pull-in piece 64 is in the form of a rod extending substantially forward from both extreme ends of the turning arm 63, which is covered by a rubber tube or the like which has a relatively large coefficient of friction into order to increase the force for pulling in the spoke 20. The pull-in piece 64 is slightly inclined in the direction opposite the turning direction and in the direction of the turning center with the horizontal direction being a reference. The pull-in piece 64 is disposed so as to come in contact from the bottom with the vicinity of the extreme end of the spoke 20 in the half-inserted state inserted from inside into the first collar portion 2 by the first driving apparatus 11 above the rotating track thereof and the spoke 20 in the half-inserted state inserted from outside into the second collar portion 3 by the fourth driving apparatus 14. When the pull-in piece 64 is turned by the motor 65, as shown in FIG. 9, the turning direction at the turning upper portion in contact with the half-inserted spoke 20 is substantially the same direction as the axial outward of the hub 1, that is, the inserting direction of the spoke 20 inserted from inside into the first collar portion 2 and of the spoke inserted from inside into the second collar portion 3, and therefore, these half-inserted spokes can be pulled into the inserting direction and moved in the completely inserted state. At this time, the pull-in piece 64 is not projected vertically from both extreme ends of the turning arm 63 in the vertical state, that is, horizontally, but is slightly inclined in the direction opposite to the turning direction and in the direction of the turning center with the horizontal direction being a reference, and therefore, the half-inserted spoke 20 can be handled so that its extreme end is directed slightly forward. It is therefore possible to prevent the spokes 20 from impinging upon other parts of the spoke inserting apparatus and to provide an effect that the spokes are prevented from being entangled with each other. The pull-in pipe 67 is in the form of a flexible rubber hose which is longer than the pull-in piece 64, which is projected from the turning arm 63 in the vicinity of the pull-in piece 64 to pull in the spoke 20 deviated from the rotating track of the pull-in piece 64, thus improving the pulling performance of the spokes 20.

The second spoke handling apparatus 19 also comprises a turning arm 71, a pull-in piece 72, a motor 73, a connecting plate 74, an a pull-in pipe 75, similar to the first spoke handling apparatus 18. In this case, however, the spoke 20 inserted from inside into the second collar portion 3 by the third driving apparatus 13 and the spoke 20 inserted from outside into the second collar portion 2 by the second driving apparatus 12 are pulled leftward close to their inserting direction into the completely inserting state. Therefore, the turning arm 71 rotates opposite to the turning arm 63 of the first spoke handling apparatus 18. The connecting plate 66 of the first spoke handling apparatus 18 is connected to a moving bed 88 of a second supporting portion 82 supporting the second driving apparatus 12 out of the supporting apparatus 6 described later, and the connecting plate 74 of the second spoke handling apparatus 19 is connected to a moving bed 88 of a fourth supporting portion 84 supporting the second driving apparatus 14 out of the supporting apparatus 15. The driving systems of the pull-in pieces 64, 72 include a system for always rotating them at fixed rotational speed, and a system for rotating them once simultaneously with the completion of the driving operation of the corresponding driving apparatus to 14.

The supporting apparatus 6 comprises a first supporting portion 81 for supporting the first driving apparatus 11, a second supporting portion 82 for supporting the second driving apparatus 12, a third supporting portion 83 for supporting the third driving apparatus 13, a fourth supporting portion 84 for supporting the fourth driving apparatus 14. The first supporting portion 81 comprises a fixed bed 85, a pair of rails 86, four sliding bodies 87, a moving bed 88 and a supporting means 89. The fixed bed 85 is a rectangular flat plate, which is laid on the upper surface of the base 25. The pair of rails 86 are fixed in a lateral direction on the upper surface of the fixed bed 85. On the other hand, the four sliding bodies 87 are provided every two laterally on the lower surface of the moving bed 88 in the form of a rectangular flat plate and in two rows longitudinally and are slidably fitted in the rails 86. The supporting means 89 is provided to support the first driving apparatus 11 upwardly of the moving bed 88 to adjust the position and attitude of the first driving apparatus 11. By the first supporting portion 81 having the aforementioned construction, the first driving apparatus 11 can be fixed in a predetermined position and in a predetermined attitude and can be slidably moved laterally. The second supporting portion 82, the third supporting portion 83, and the fourth supporting portion 84 also have the same construction to slidably move the second driving apparatus 12, the third driving apparatus 13, and the fourth driving apparatus 14 supported thereby, respectively, and fix them in the predetermined position and in the predetermined attitude.

The first supporting portion 81 to the fourth supporting portion 84 are respectively provided with a mechanism for adjusting the lateral position of the first driving apparatus 11 to the fourth driving apparatus 14 supported thereby, respectively. This mechanism comprises a first feed screw 91, a second feed screw 92, a third feed screw 93, and a fourth feed screw 94, a connecting shaft 95, a transmission belt 96, a transmission belt 97, and a motor 98. The first feed screw 91 is rotatably provided on the fixed bed 85 of the first supporting portion 81 parallel with the rails 86, that is, in the lateral direction, to which is threadedly fitted a female-thread body 90 secured to the moving bed 88. The second feed screw 92, the third feed screw 93, and the fourth feed screw 94 are likewise rotatably provided on the fixed bed 85 of the second supporting portion 82, the third supporting portion 83, and the fourth supporting portion 84, respectively, in the lateral direction, to which are threadedly fitted a female-thread body 90 secured to the moving bed 88. The second feed screw 92 and the fourth feed screw 94 are provided on one and the same shaft and connected by the connecting shaft 95. The transmission belt 96 is extended between the second feed screw 92 and the third feed screw 93 for belt transmission. The transmission belt 97 is extended between the first feed screw 91 and the fourth feed screw 94 for belt transmission. The second feed screw 92 is driven by the motor 98. The first feed screw 91, the second feed screw 92, the third feed screw 93, and the fourth feed screw 94 have the same pitch, but the first feed screw 91 and the second feed screw 92 are set to left-hand, and the third feed screw 93 and the fourth feed screw 94 are set to right-hand. Accordingly, when the second feed screw 92 is driven by the motor 98, the first feed screw 91, the second feed screw 92, the third feed screw 93, and the fourth feed screw 94 rotate in the same direction and at the same speed. Therefore, the first driving apparatus 11 and the second driving apparatus 12 are moved by the same distance in either direction of left or right, and the third driving apparatus 13 and the fourth driving apparatus 14 are moved by the same distance in the other direction of left or right (in the direction opposite to the first driving apparatus). That is, the set of the first driving apparatus 11 and the second driving apparatus 12, and the set of the third driving apparatus 13 and the fourth driving apparatus 14 move mutually symmetrically to left and right. At this time, the first photo-sensor 16 and the first spoke handling apparatus 18 move integral with the first driving apparatus 11 and the second driving apparatus 12, and their relative position and attitude remain unchanged. Likewise, the second photo-sensor 17 and the second spoke handling apparatus 19 move integral with the third driving apparatus 13 and the fourth driving apparatus 14.

The method for inserting the spokes 20 into the spoke holes 6, 7 of the first collar portion 2 and the second collar portion 3 of the hub 1, using the aforementioned spoke inserting apparatus will be described below. First, both ends of the hub shaft 4 of the hub 1 are supported on the supporting arms 21, 22 of the hub supporting apparatus 10, and the hub rotating roller 44 is moved down by the air cylinder 46 into contact with the first collar portion 2 and the second collar portion 3 of the hub 1. In this state, the motor 45 is driven to rotate the hub 1 so that the spoke hole 6 of the first collar portion 2 is located at forward-upward 45° and stops. Subsequently, the motor 98 is actuated to move the first driving apparatus 11, the second driving apparatus 12, the first photo-sensor 16 and the first spoke handling apparatus 18 in the lateral direction so that the point of intersection 8 in the driving direction between the first driving apparatus 11 and the second driving apparatus 12 coincides with the first collar portion 2. At this time, the set of the first driving apparatus 11 and the second driving apparatus 12, and the set of the third driving apparatus 13 and the fourth driving apparatus 14 move mutually symmetrically, and the hub 1 is supported in the midst between these sets so that the point of intersection 9 in the driving direction between the third driving apparatus 13 and the fourth driving apparatus 14 coincides with the second collar portion 3. Further, the motor 30 is driven to move the supported hub 1 forward-upward 45 so that the point of intersection 8 in the driving direction between the first driving apparatus 11 and the second driving apparatus 12 coincides with the spoke hole 6 of the first collar portion 2. At this time, the point of intersection 9 in the driving direction between the third driving apparatus 13 and the fourth driving apparatus 14 is located on the rotating track of the spoke hole 7 of the second collar portion 3. Even various hubs 1 in which the spacing between both the collar portions 2, 3, the diameter of the collar portions 2, 3 (that is, the diameter of the circular track on which are arranged the spoke holes 6, 7) or the pitch of the spoke holes 6, 7 are different, they can be set in the above-described operation. That is, any hub 1 can be set merely by two operations for driving the motor 30 and the motor 98.

After the hub 1 has been set as described above, the motor 45 and the driving apparatuses 11 to 14 are actuated in accordance with the output signals of the photo-sensors 16, 17. First, since in the aforementioned state, the spoke hole 6 of the first collar portion 2 coincides with the point of intersection 8 in the driving direction between the first driving apparatus 11 and the second driving apparatus 12, the first driving apparatus 11 or the second driving apparatus 12 is actuated to insert the spoke 20 into the spoke hole 6 of the first collar portion 2. Generally, the spoke hole 6 of the first hub portion 2 of the hub 1 and the spoke hole 7 of the second collar portion 3 are not disposed in the symmetrical position but the other spoke hole 7 is disposed between one spoke holes 6. Accordingly, after completion of insertion, when the motor 45 is actuated, the output signal of the second photo-sensor 17 is provided which alarms the coincidence between the point of intersection 9 in the driving direction between the third driving apparatus 13 and the fourth driving apparatus 14 and the spoke hole 7 of the second collar portion 3, by which signal the motor 45 is stopped, and one of the third driving apparatus 13 and the fourth driving apparatus 14 is actuated to insert the spoke 20 into the spoke hole 7 of the second collar portion 3. After completion of insertion, the motor 45 is again actuated, and the motor 45 is stopped by the output signal which alarms the coincidence between the spoke hole 6 of the first collar portion 2 and the point of intersection 8 in the driving direction between the first driving apparatus 11 and the second driving apparatus 12, and the spoke 20 is inserted by the other of the first driving apparatus 11 and the second driving apparatus 12. That is, with respect to the first collar portion 2, the first driving apparatus 11 and the second driving apparatus 12 are alternately actuated. After completion of insertion, the motor 45 is again actuated, and the motor 45 is stopped by the output signal of the second photo-sensor 17 which alarms the coincidence between the point of intersection 9 in the driving direction between the first driving apparatus 13 and the second driving apparatus 14 and the spoke hole 7 of the second collar portion 3 and the spoke 20 is inserted into the spoke hole 7 of the second collar portion 3 by the other of the third driving apparatus 13 and the fourth driving apparatus 14. Also, with respect to the second collar portion 3, the third driving apparatus 13 and the fourth driving apparatus 14 are alternately actuated. These operations are repeated whereby the spokes 20 can be inserted into all the spoke holes 6, 7.

While one mode the embodiment has been introduced, it is to be noted that the embodiment of the spoke inserting apparatus according to the present invention is not limited thereto. For example, the pull-in piece 64 of the first spoke handling apparatus 18 and the pull-in piece 72 of the second spoke handling apparatus 19 are projected while being slightly inclined opposite to the turning direction and the turning center with the horizontal direction being a reference from the turning arms 63, 71 as described above, however, it may be projected horizontally. Note, for the motor 30, the motor 45 and the motor 98, for example, stepping motors capable of controlling rotation and stop may be used. A direct acting bearing is provided on the sliding surface of the sliding body 29, the sliding body 49 and the sliding body 87.

As described above, even in the case where the diameter of the collar portion of the hub is different, the spoke driving direction of both the driving apparatuses can be coincided with the spoke inserting hole by the single operation of reciprocating the hub in the hub supporting apparatus in the direction passing through the center of the collar portion and the spoke inserting hole. Therefore, the cumbersome adjustment of directing the driving direction of the driving apparatus at the spoke hole of the collar portion, and the troublesome operation of moving the hub in two stages vertically and longitudinally within the plane vertical to the axial direction thereof with the provision of the vertical moving mechanism and the longitudinal moving mechanism on the hub supporting apparatus can be simplified.

Further, the driving direction of both the driving apparatuses with respect to the collar portions and the optical axis of the photo-sensor are intersected at one point so that the driving apparatus directly aims at the spoke hole detected by the photo-sensor. Therefore, the hit rate is high, and even if the pitch of the spoke hole of the collar portion is different, it is not necessary to adjust the driving direction of the driving apparatus. Further, since the spoke entanglement preventive apparatus is made for two apparatuses, i.e. the first and second handling apparatuses, the entire apparatus can be simplified as compared with the case where the spoke handling apparatus is provided every spoke driven by the driving apparatus. Furthermore, even with respect to the hub in which the spacing between the first and second collar portions is different, such a hub can be processed by symmetrically moving one set for insertion into the first collar and one set for insertion into the second collar. It is not necessary to individually adjust the driving directions of the driving apparatuses. Further, the first spoke handling apparatus is made integral with one set for insertion into the first collar portion and the second spoke handling apparatus is made integral with one set for insertion into the second collar portion for movement. Therefore, it is not necessary to individually adjust the positions of the spoke handling apparatuses, and the operation can be simplified also in this respect.

Synthetically, the hubs of various sizes in which the pitch of the spoke hole, the spacing between both the collar portions or the diameter of the collar portion is different can be processed by two operations, i.e. the operation of symmetrically moving one set for insertion into the first collar portion and one set for insertion into the second collar portion, and the operation of obliquely reciprocating the hub by the sliding mechanism provided on the hub supporting apparatus.

What is claimed is:

1. A spoke inserting apparatus comprising:

a first driving apparatus (11) and a second driving apparatus (12) for inserting spokes into spoke holes of a first collar portion (2) of a hub (1), the first driving apparatus (11) and the second driving apparatus (12) being arranged on both sides of the first collar portion (2) to alternately insert the spokes from inside and outside into the spoke holes of the first collar portion (2), a third driving apparatus (13) and a fourth driving apparatus (14) for inserting spokes into spoke holes of a second collar portion (3) of the hub (1), the third driving apparatus (13) and the fourth driving apparatus (14) being arranged on both sides of the second collar portion (3) to alternately insert the spokes from inside and outside into the spoke holes of the second collar portion (3), and a first photo-sensor (16) for detecting the coincidence of the driving directions of the first driving apparatus (11) and the second driving apparatus (12) with one of the spoke inserting holes of the first collar portion (2), and a second photo-sensor (17) for detecting the coincidence of the driving directions of the third driving apparatus (13) and the fourth driving apparatus (14) with one of the spoke inserting holes of the second collar portion (3), wherein the driving directions of each of the first (11), second (12), third (13) and forth (14) driving apparatuses are directed at one of said spoke inserting holes located obliquely upwardly of a hub shaft out of all the spoke holes of the first collar portion ) or the second collar portion (3) to be inserted thereby, a hub supporting apparatus (10) for rotatably supporting the hub (1) on the hub shaft and horizontally supporting said hub shaft is provided, said hub supporting apparatus (10) comprising a base (25), an oblique guide (28) on the base (25), an angle of the oblique guide (28) being changeable, an moving bed (27) having a sliding body (29) which slides along said oblique guide (28), and a supporting arm (21, 22) attached to the moving bed (27).

2. A spoke inserting apparatus comprising:

a first driving apparatus (11) and a second driving apparatus (12) arranged on both sides of a first collar portion (2) of a hub (1) to alternately insert spokes from inside and outside into spoke holes of the first collar portion (2), a third driving apparatus (13) and a fourth driving apparatus (14) arranged on both sides of a second collar portion (3) to alternately insert spokes from inside and outside into spoke holes of the second collar portion (3), a first photo-sensor (16) for detecting the coincidence of the driving directions of the first driving apparatus (11) and the second driving apparatus (12) with spoke inserting holes of the first collar portion (2), and a second photo-sensor (17) for detecting the coincidence of the driving directions of the third driving apparatus (13) and the fourth driving apparatus (14) with spoke inserting holes of the second collar portion (3), wherein the first driving apparatus (11) and the second driving apparatus (12) have their spoke driving directions intersected at a first point, the third driving apparatus (13) and the fourth driving apparatus (14) have their spoke driving directions intersected at a second point, the first photo-sensor (16) has an optical axis passing through a first point of intersection between the spoke driving directions of the first driving apparatus (11) and the second driving apparatus (12) and outputs a signal when said optical axis coincides with the spoke hole (6), the second photo-sensor (17) has an optical axis passing through a second point of intersection between the spoke driving directions of the third driving apparatus (13) and the fourth driving apparatus (14) and outputs a signal when said optical axis coincides with the spoke hole (6), a spoke entanglement preventive apparatus (including 18, 19) for transferring a spoke inserted in a half-inserted state into the spoke hole of the hub to a final inserting position is provided, said spoke entanglement preventive apparatus comprising a first spoke handling apparatus (18) disposed externally of the first collar portion (2), the first spoke handling apparatus (18) comprising a turning arm (63) which turns within a vertical plane parallel with the hub shaft (4) and a rod-like pull-in piece (64) provided at an extreme end of the turning arm (63), the turning direction of the turning arm (63) being set outwardly in an axial direction of the hub upwardly of a turning track, said pull-in piece (64) being positioned so as to be placed in contact from the bottom with the vicinity of the extreme end of the spoke inserted into the first collar portion (2) by the first driving apparatus (11) and the spoke inserted into the second collar portion (3) by the fourth driving apparatus (14) upwardly of the turning track, and a second spoke handling apparatus (19) disposed externally of the second collar portion (3), said second spoke handling apparatus (19) comprising a turning arm (71) which turns within a vertical plane parallel with the hub shaft (4) and a rod-like pull-in piece (72) provided at an extreme end of said turning arm (71), the turning direction of said turning arm being set outwardly in an axial direction of the hub upwardly of a turning track, said pull-in piece (72) being positioned so as to be placed in contact from the bottom with the vicinity of the extreme end of the spoke inserted into the second collar portion (3) by the third driving apparatus and the spoke inserted into the first collar portion (2) by the second driving apparatus upwardly of the turning track, a supporting apparatus (15) for the driving apparatus is provided, said supporting apparatus determining relative position and relative posture of the first driving apparatus (11), the second driving apparatus (12), the first photo-sensor (16) and the first spoke handling apparatus (18), said supporting apparatus (15) also determining relative position and relative posture of the third driving apparatus (13), the fourth driving apparatus (14), the second photo-sensor (17) and the second spoke handling apparatus (19), wherein the first driving apparatus (11), the second driving apparatus (12), the first photo-sensor(6) and the first spoke handling apparatus (18) being placed integral with each other constituting a first group, and the third driving apparatus (13), the fourth driving apparatus (14), the second photo-sensor (17) and the second spoke handling apparatus (19) being placed integral with each other constituting a second group and the first group and the second group capable of being reciprocated in an axial direction of the hub and symmetrically.

3. A spoke inserting apparatus comprising:

a first driving apparatus (11) and a second driving apparatus (12) for inserting spokes into spoke holes of a first collar portion (2) of a hub (1), the first driving apparatus (11) and the second driving apparatus (12) being arranged on both sides of the first collar portion (2) to alternately insert the spokes from inside and outside into the spoke holes of the first collar portion (2), a third driving apparatus (13) and a fourth driving apparatus (14) for inserting spokes into spoke holes of a second collar portion (3 of the hub, the third driving apparatus (13) and the fourth driving apparatus (14) being arranged on both sides of the second collar portion (3) to alternately insert the spokes from inside and outside into the spoke holes of the second collar portion (3), and a first photo-sensor (16) for detecting the coincidence of the driving directions of the first driving apparatus (11) and the second driving apparatus (12) with one of the spoke inserting holes of the first collar portion (2), and a second photo-sensor (17) for detecting the coincidence of the driving directions of the third driving apparatus (13) and the fourth driving apparatus (14) with one of the spoke inserting holes of the second collar portion (3), wherein the driving directions of each of the first (11), second (12), third (13) and forth (14) driving apparatuses are directed at one of said spoke inserting holes located obliquely upwardly of a hub shaft (4) out of all the spoke holes of the first collar portion ) or the second collar portion (3) to be inserted thereby, a hub supporting apparatus (10) for rotatably supporting the hub (1) on the hub shaft (4) and horizontally supporting said hub shaft is provided, said hub supporting apparatus (10) comprising a base (25), an oblique guide (28) on the base (25), an angle of the oblique guide (28) being changeable, a moving bed (27) having a sliding body (29) which slides along said oblique guide (28), and a supporting arm (21, 22) attached to the moving bed (27), the first driving apparatus (11) and the second driving apparatus (12) have their spoke driving directions intersected at a first point, the third driving apparatus (13) and the fourth driving apparatus (14) have their spoke driving directions intersected at a second point, the first photo-sensor (16) has an optical axis passing through a first point of intersection between the spoke driving directions of the first driving apparatus (11) and the second driving apparatus (12) and outputs a signal when said optical axis coincides with the spoke hole, the second photo-sensor (17) has an optical axis passing through a second point of intersection between the spoke driving directions of the third driving apparatus (13) and the fourth driving apparatus (14) and outputs a signal when said optical axis coincides with the spoke hole, a spoke entanglement preventive apparatus (including 18, 19) for transferring a spoke inserted in a half-inserted state into the spoke hole of the hub to a final inserting position is provided, said spoke entanglement preventive apparatus comprising a first spoke handling apparatus (18) disposed externally of the first collar portion (2), the first spoke handling apparatus (18) comprising a turning arm (63) which turns within a vertical plane parallel with the hub shaft and a rod-like pull-in piece (64) provided at an extreme end of the turning arm, the turning direction of the turning arm being set outwardly in an axial direction of the hub upwardly of a turning track, said pull-in piece (64) being positioned so as to be placed in contact from the bottom with the vicinity of the extreme end of the spoke inserted into the first collar portion (2) by the first driving apparatus (11) and the spoke inserted into the second collar portion (3) by the fourth driving apparatus (14) upwardly of the turning track, and a second spoke handling apparatus (19) disposed externally of the second collar portion (3), said second spoke handling apparatus (19) comprising a turning arm (71) which turns within a vertical plane parallel with the hub shaft (4) and a rod-like pull-in piece (72) provided at an extreme end of said turning arm (71), the turning direction of said turning arm (71) being set outwardly in an axial direction of the hub upwardly of a turning track, said pull-in piece (72) being positioned so as to be placed in contact from the bottom with the vicinity of the extreme end of the spoke inserted into the second collar portions by the third driving apparatus and the spoke inserted into the first collar portion (2) by the second driving apparatus upwardly of the turning track, a supporting apparatus (15) for the driving apparatus is provided, said supporting apparatus (15) determining relative position and relative posture of the first driving apparatus (11), the second driving apparatus (12), the first photo-sensor (16) and the first spoke handling apparatus (18), said supporting apparatus (15) also determining relative position and relative posture of the third driving apparatus (13), the fourth driving apparatus (14), the second photo-sensor (17) and the second spoke handling apparatus (19), wherein the first driving apparatus (11), the second driving apparatus (12), the first photo-sensor (16) and the first spoke handling apparatus (18) being placed integral with each other constituting a first group, and the third driving apparatus (13), the fourth driving apparatus (14), the second photo-sensor (17) and the second spoke handling apparatus (19) being placed integral with each other constituting a second group and the first group and the second group capable of being reciprocated in an axial direction of the hub and symmetrically.

4. A spoke inserting apparatus comprising:

a first driving apparatus (11) and a second driving apparatus (12) for inserting spokes into spoke holes of a first collar portion (2) of a hub, the first driving apparatus (11) and the second driving apparatus (12) being arranged on both sides of the first collar portion (2) to alternately insert the spokes from inside and outside into the spoke holes of the first collar portion (2), a third driving apparatus (3) and a fourth driving apparatus (14) for inserting spokes into spoke holes of a second collar portion (3) of the hub, the third driving apparatus (13) and the fourth driving apparatus (14) being arranged on both sides of the second collar portion to alternately insert the spokes from inside and outside into the spoke holes of the second collar portion (3), and a first photo-sensor (16) for detecting the coincidence of the driving directions of the first driving apparatus (11) and the second driving apparatus (12) with one of the spoke inserting holes of the first collar portion (2), and a second photo-sensor (17) for detecting the coincidence of the driving directions of the third driving apparatus (13) and the fourth driving apparatus (14) with one of the spoke inserting holes of the second collar portion (3), wherein the driving directions of each of the first (11), second (12), third (13) and forth (14) driving apparatuses are directed at one of said spoke inserting holes located obliquely upwardly of a hub shaft out of all the spoke holes of the first collar portion (2) or the second collar portion (3) to be inserted thereby, a hub supporting apparatus (10) for rotatably supporting the hub (1) on the hub shaft and horizontally supporting said hub shaft is provided, said hub supporting apparatus (10) comprising a base (25), supporting arms (21, 22), an oblique base bed (26) provided between the supporting arms (21, 22) and said base (25), said base bed (26) connected to said base (25), a moving bed (27) connected to the supporting arms (21, 22) and disposed parallel with said base bed (26), an oblique guide (28) provided on an upper surface of said base bed (26), an angle of the oblique guide (28) being changeable;

a sliding body (29) provided on a lower surface of said moving bed (27) and combined with said oblique guide (28).

* * * * *